(12) United States Patent
Ichiroku et al.

(10) Patent No.: US 7,820,742 B2
(45) Date of Patent: Oct. 26, 2010

(54) ADHESIVE EXHIBITING MAXIMUM MELT VISCOSITY OF 10,000 PA S AT 40 TO 80 DEGREES C

(75) Inventors: Nobuhiro Ichiroku, Tomioka (JP); Shouhei Kozakai, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 632 days.

(21) Appl. No.: 11/706,272

(22) Filed: Feb. 15, 2007

(65) Prior Publication Data

US 2007/0191552 A1 Aug. 16, 2007

(30) Foreign Application Priority Data

Feb. 16, 2006 (JP) .............................. 2006-038788

(51) Int. Cl.
*B32B 27/38* (2006.01)
*C08K 3/36* (2006.01)
*C08L 63/02* (2006.01)
*C08L 79/08* (2006.01)

(52) U.S. Cl. ........................ 523/466; 428/413; 523/457; 523/458; 523/468; 525/423

(58) Field of Classification Search ........................ None
See application file for complete search history.

(56) References Cited

U.S. PATENT DOCUMENTS 5,194,455 A * 3/1993 Massow et al. ............. 522/152
6,949,619 B2 * 9/2005 Ichiroku et al. ............. 528/353
7,364,797 B2 * 4/2008 Kozakai et al. ............. 428/447
2008/0032103 A1 * 2/2008 Kikuchi et al. ............. 428/214

FOREIGN PATENT DOCUMENTS

| EP | 1170416 A2 * | 1/2002 |
| JP | 3-189127 A | 8/1991 |
| JP | 7-224259 A | 8/1995 |
| JP | 8-27427 A | 1/1996 |
| JP | 10-60111 A | 3/1998 |
| JP | 2000-263647 A * | 9/2000 |
| JP | 2003-193016 A | 7/2003 |
| JP | 2004-210805 A * | 7/2004 |

* cited by examiner

*Primary Examiner*—Robert Sellers
(74) *Attorney, Agent, or Firm*—Birch, Stewart, Kolasch & Birch, LLP

(57) ABSTRACT

Provided is an adhesive composition, which exhibits a melt viscosity at 40 to 80° C. of not more than 10,000 Pa·s, and which after heating for a period of 1 minute to 2 hours at a temperature within a range from 80° C. to (T+50)° C., exhibits a melt viscosity at a temperature of 100° C. to (T+30)° C. that is within a range from 100 to 10,000 Pa·s (wherein, T represents the curing start temperature for the composition). The adhesive composition is capable of forming a cured product that exhibits excellent filling of substrates with finely patterned circuits, excellent lamination performance at low temperatures, a low elastic modulus, and excellent levels of adhesion and heat resistance. The adhesive composition is useful for providing an adhesive film and for producing a semiconductor device.

11 Claims, 1 Drawing Sheet

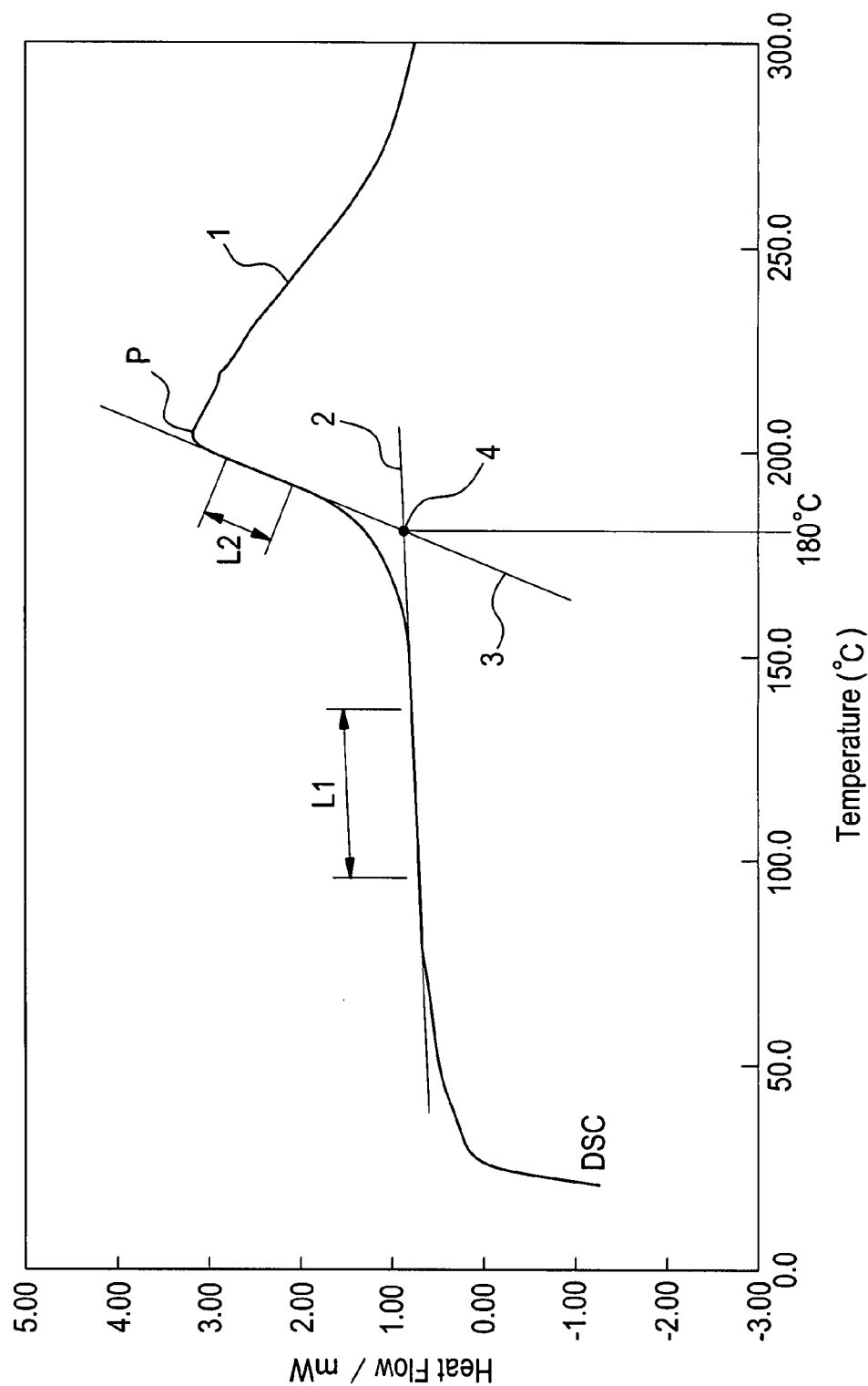

ADHESIVE EXHIBITING MAXIMUM MELT VISCOSITY OF 10,000 PA S AT 40 TO 80 DEGREES C

BACKGROUND OF THE INVENTION

1. Field of the Invention

The present invention relates to an adhesive composition that can be used in the production of semiconductor devices, is ideal for use within resin-molded semiconductor packages, exhibits excellent filling of substrates with finely patterned surfaces, and also has a low elastic modulus and high adhesive strength, and also relates to an adhesive film that comprises such an adhesive composition, and a method of producing a semiconductor device that uses such an adhesive film.

2. Description of the Prior Art

In the production of a semiconductor device, a large diameter silicon wafer with IC circuits formed thereon is cut into semiconductor chips in a dicing (cutting) step, a semiconductor chip is mounted to a lead frame by thermocompression bonding or the like using a liquid adhesive (a die bonding material), wire bonding is conducted between the electrodes, and the entire structure is then sealed in order to improve the handling properties and protect the device from the external environment. Examples of suitable sealing techniques include airtight sealing such as metal sealing and ceramic sealing, and non-airtight sealing using resins. Transfer molding using resins is the most widely used technique as it is inexpensive and offers excellent applicability to mass production. However, despite these advantages, resin-molded packages suffer from inferior levels of moisture resistance, heat resistance, thermal stress relaxation, and heat radiation.

Furthermore, in recent years, as a result of the trends towards smaller and increasingly multifunctional electrical and electronic equipment, the demands for increasingly sophisticated electronic components have lead to finer wiring and increased wiring density within semiconductor devices. As a result of this increase in semiconductor chip size, and the use of semiconductor devices that have structures of the same size as the chip (CSP) (which employ area array bonding and have no lead frame), or structures that employ chip layering (such as stacked CSP and SiP), the thermal shock (stress) during the packaging (PKG) of these devices is becoming a significant problem.

Moreover, in the processes for mounting these semiconductor devices onto a printed circuit board, the reflow resistance required for lead-free solders has reached a considerably high temperature (265° C.), which is also problematic. Accordingly, there is a strong need to ensure optimization and maximum performance of the materials used in these processes. Amongst the various packaging materials, the properties of die bonding materials in particular can be controlled and varied over a relatively wide range, and can therefore be readily adapted to meet these needs. Specifically, a die material having a low elastic modulus and high levels of adhesive strength and heat resistance, which is also capable of withstanding harsh thermal shock (stress) is required as the die bonding material.

Furthermore, miniaturization is also being demanded of the support substrates onto which the semiconductor chips are mounted. The use of liquid adhesives can cause problems, including contamination of electrodes caused by liquid adhesive exuding out around the edges of the chip during chip mounting, and wire bonding problems due to chip tilt caused by uneven thickness within the adhesive layer. Accordingly, the development of adhesive films capable of overcoming these problems is also keenly sought.

Examples of conventional adhesives include low elastic modulus materials in which siloxane structures have been introduced into highly heat-resistant polyimide and polyamide resins. Publications such as JP 3-189127 A (patent reference 1) disclose siloxane-modified polyamideimides, but the elastic modulus of such resins is still not low enough, and the adhesion of such resins to substrates is not entirely satisfactory.

JP 10-60111 A (patent reference 2) discloses the blending of a compound having two or more maleimide groups with a siloxane-modified polyamideimide, thereby improving the high-temperature properties, but the adhesive strength of this resin composition is poor.

Furthermore, JP 7-224259 A (patent reference 3) and JP 8-27427 A (patent reference 4) disclose heat-resistant adhesive films comprising a polyimide silicone and an epoxy resin, and these resins offer excellent adhesion, a low elastic modulus, and excellent heat resistance. However, although these adhesive films offer improved adhesive strength, their filling of substrates with fine surface irregularities is unsatisfactory. As a result, small voids can develop during die attachment, and these voids can lead to peeling of the adhesive film, meaning the films tend to suffer from reliability problems. Furthermore, if a large quantity of an inorganic filler is added in order to improve the reliability by reducing the coefficient of water absorption and the coefficient of linear expansion, then the performance of the adhesive during low-temperature lamination to semiconductor wafers at temperatures of 100° C. or lower tends to deteriorate.

[Patent Reference 1] JP 3-189127 A
[Patent Reference 2] JP 10-60111 A
[Patent Reference 3] JP 7-224259 A
[Patent Reference 4] JP 8-27427 A
[Patent Reference 5] JP 2003-193016 A

SUMMARY OF THE INVENTION

Problems Invention Aims to Solve

The present invention takes the above circumstances into consideration and aims to resolve the problems described above, and has an object of providing an adhesive composition capable of forming a cured product that exhibits excellent filling of substrates with finely patterned circuits, excellent lamination performance at low temperatures, a low elastic modulus, and excellent levels of adhesion and heat resistance, and also providing an adhesive film that comprises such a composition, and a method of producing a semiconductor device that uses such an adhesive film.

Means For Solution of the Problems

As a result of intensive investigation aimed at achieving the above object, the inventors of the present invention discovered that an adhesive composition having a melt viscosity that falls within specific ranges prior to, and following, a specific heating operation produces a cured product that exhibits excellent filling of substrates with finely patterned circuits and excellent lamination performance at low temperatures, and also has a low elastic modulus and excellent levels of adhesive strength and heat resistance, and they were thus able to complete the present invention.

Thus, the present invention provides an adhesive composition, which exhibits a melt viscosity at 40 to 80° C. of not more than 10,000 Pa·s, and which after heating for a period of 1 minute to 2 hours at a temperature within a range from 80° C. to (T+50)° C., exhibits a melt viscosity at a temperature of 100° C. to (T+30)° C. that is within a range from 100 to 10,000 Pa·s, wherein T represents a curing start temperature for said composition.

The adhesive composition preferably comprises:

(A) at least one resin selected from the group consisting of polyamic acid resins having a diorganopolysiloxane chain and phenolic hydroxyl groups within the polymer backbone, and polyimide resins that are ring-closing derivatives of these polyamic acid resins, (B) an epoxy resin, (C) an epoxy resin curing catalyst, and (D) an inorganic filler.

A second aspect of the present invention provides a laminate comprising a substrate, and an adhesive film that comprises the adhesive composition defined above provided on top of said substrate. The adhesive film is useful as a die bonding sheet for producing a semiconductor device.

A third aspect of the present invention provides a method of producing a semiconductor device using the above adhesive film, comprising the steps of:

thermocompression bonding a semiconductor wafer through said adhesive film to a substrate at a temperature of 40 to 80° C., and conducting wire bonding at a temperature within a range from 80° C. to (T+50)° C. over a period of 1 minute to 2 hours (wherein, T is as defined above).

Effects of Invention

An adhesive film produced using an adhesive composition of the present invention exhibits powerful adhesive strength to all manner of substrates upon thermocompression bonding and heat-curing, and also has a low elastic modulus and a high level of heat resistance. Accordingly, this adhesive film can be used to produce a highly reliable resin-packaged semiconductor device.

BRIEF DESCRIPTION OF THE DRAWINGS

FIG. 1 is a differential scanning calorimetry chart of an adhesive composition of an example 1.

DETAILED DESCRIPTION OF THE PREFERRED EMBODIMENTS

As follows is a detailed description of the present invention. In this description, room temperature refers to a temperature of 25° C.

The adhesive composition used in producing an adhesive film of the present invention retains its shape at room temperature, can be used to form a thin film, forms an intermediate plastic state and then cures upon heating, exhibits excellent adhesion to substrates, and yields a cured product that has a low elastic modulus and superior heat resistance.

[Component (A)]

The component (A) comprises at least one resin selected from the group consisting of polyamic acid resins having a diorganopolysiloxane chain and phenolic hydroxyl groups within the polymer backbone, and polyimide resins that are ring-closing derivatives of these polyamic acid resins. Examples of the component (A) include the polyamic acid resins represented by a general formula (3) shown below and polyimide resins represented by a general formula (4) shown below. If a polyamic acid resin represented by the general formula (3) shown below is used, then imidization (cyclodehydration) tends to occur during the heat-curing conducted in the die bonding process, and the water generated as a by-product of this imidization can cause peeling or the like at the adhesion surface. Consequently, the use of a polyimide resin represented by the general formula (4) shown below, which has already undergone imidization (cyclodehydration), is preferred. In the present invention, the component (A) must comprise a diorganopolysiloxane chain, and from the viewpoint of achieving favorable adhesion, preferably also comprises phenolic hydroxyl groups within the resin backbone.

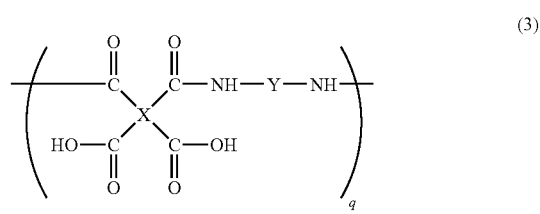

(3)

(wherein, X represents a tetravalent organic group comprising an aromatic ring or an aliphatic ring, Y represents a bivalent organic group, and q represents an integer from 1 to 300)

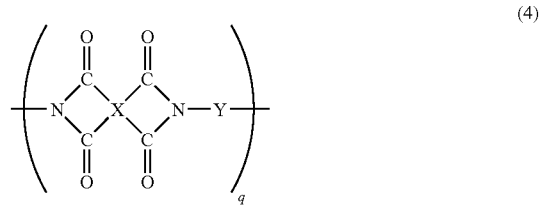

(4)

(wherein, X represents a tetravalent organic group comprising an aromatic ring or an aliphatic ring, Y represents a bivalent organic group, and q represents an integer from 1 to 300)

In the above general formula (3), q is an integer from 1 to 300, and is preferably an integer from 2 to 300, and even more preferably an integer from 5 to 300. A polyamic resin containing this number of repeating units can be produced relatively easily using the method described below. Furthermore, a polyimide resin represented by the above general formula (4) can be obtained by subjecting a polyamic acid resin of the general formula (3) to dehydration and cyclization using normal methods.

A polyamic acid resin represented by the general formula (3) can be obtained by reacting together substantially equimolar quantities of a tetracarboxylic dianhydride represented by a structural formula (5) shown below:

(5)

(wherein, X is as defined above), and a diamine represented by a structural formula (6) shown below:

$H_2N-Y-NH_2$ (6)

(wherein, Y is as defined above), wherein the reaction is conducted in an organic solvent in accordance with conventional methods.

Specific examples of the tetracarboxylic dianhydride represented by the above formula (5) include the compounds shown below, although the present invention is not restricted to these compounds.

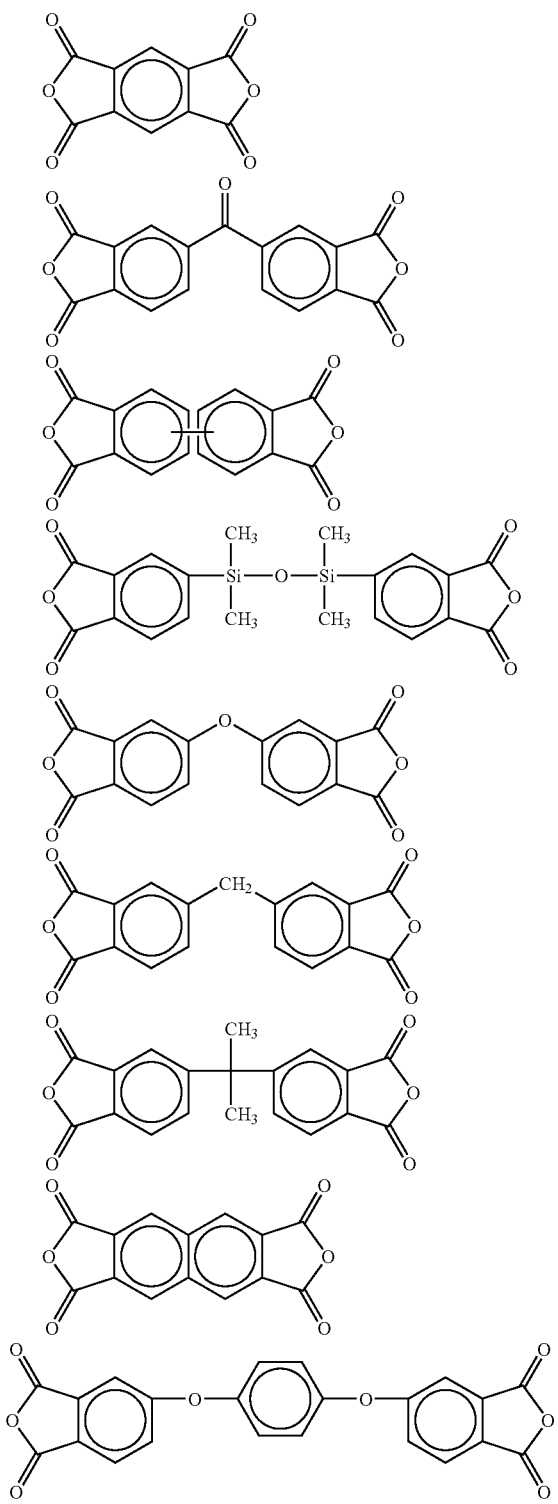

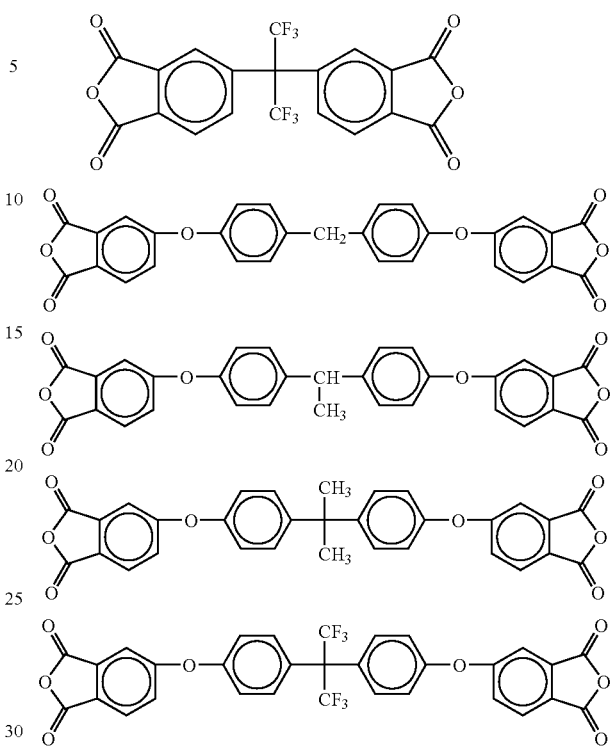

These tetracarboxylic dianhydrides represented by the above formula (5) may be used either alone, or in combinations of two or more different compounds, depending on need.

From the viewpoints of achieving favorable solubility in organic solvents, favorable adhesion to substrates, a low elastic modulus, and favorable flexibility, the diamine represented by the above formula (6) preferably comprises from 1 to 80 mol %, and even more preferably from 1 to 60 mol %, of a diaminosiloxane compound represented by a structural formula (1) shown below.

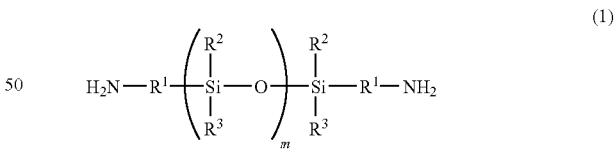

(wherein, $R^1$ groups represent identical or different bivalent organic groups of 3 to 9 carbon atoms, $R^2$ and $R^3$ represent identical or different unsubstituted or substituted monovalent hydrocarbon groups of 1 to 8 carbon atoms, and m represents an integer from 1 to 200).

In the siloxanediamine (or α,ω-diaminopolysiloxane) represented by the general formula (1), examples of the bivalent organic groups of 3 to 9 carbon atoms represented by $R^1$ include alkylene groups such as $-(CH_2)_3-$, $-(CH_2)_4-$, $-CH_2CH(CH_3)-$, $-(CH_2)_6-$, and $-(CH_2)_8-$, arylene groups such as those shown below:

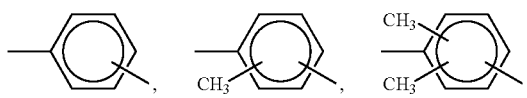

alkylene-arylene groups that are combinations of the above alkylene and arylene groups, as well as bivalent hydrocarbon groups that include an ether oxygen atom, including oxyalkylene groups such as —$(CH_2)_3$—O— and —$(CH_2)_4$—O—, oxyarylene groups such as those shown below:

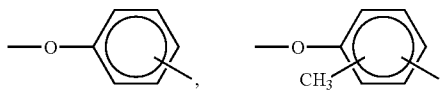

and oxyalkylene-arylene combination groups such as those shown below.

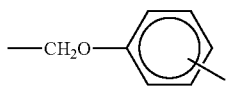

Examples of the unsubstituted or substituted monovalent hydrocarbon groups of 1 to 8 carbon atoms represented by $R^2$ and $R^3$ include alkyl groups such as a methyl group, ethyl group, propyl group, isopropyl group, butyl group, isobutyl group, tert-butyl group, hexyl group, cyclohexyl group, 2-ethylhexyl group or octyl group, alkenyl groups such as an allyl group, propenyl group, isopropenyl group, butenyl group, isobutenyl group or hexenyl group, aryl groups such as a phenyl group, tolyl group or xylyl group, aralkyl groups such as a benzyl group or phenylethyl group, and groups in which a portion of, or all of, the hydrogen atoms bonded to carbon atoms within the above hydrocarbon groups have been substituted with a halogen atom such as a fluorine, bromine or chlorine atom, including halogenated alkyl groups such as a chloromethyl group, bromoethyl group or 3,3,3-trifluoropropyl group. Of these, a methyl group or phenyl group is preferred.

These diaminosiloxane compounds represented by the above formula (1) may be used either alone, or in combinations of two or more different compounds, depending on need.

Examples of diamines of the above formula (6) besides the diaminosiloxane compounds represented by the above formula (1) include aromatic ring-containing diamines such as p-phenylenediamine, m-phenylenediamine, 4,4'-diaminodiphenylmethane, 4,4'-diaminodiphenyl ether, 2,2'-bis(4-aminophenyl)propane, 4,4'-diaminodiphenyl sulfone, 4,4'-diaminodiphenyl sulfide, 1,4-bis(3-aminophenoxy)benzene, 1,4-bis(4-aminophenoxy)benzene, 1,4-bis(p-aminophenylsulfonyl)benzene, 1,4-bis(m-aminophenylsulfonyl)benzene, 1,4-bis(p-aminophenylthioether)benzene, 1,4-bis(m-aminophenylthioether)benzene, 2,2-bis[4-(4-aminophenoxy)phenyl]propane, 2,2-bis[3-methyl-4-(4-aminophenoxy)phenyl]propane, 2,2-bis[3-chloro-4-(4-aminophenoxy)phenyl]propane, 1,1-bis[4-(4-aminophenoxy)phenyl]ethane, 1,1-bis[3-methyl-4-(4-aminophenoxy)phenyl]ethane, 1,1-bis[3-chloro-4-(4-aminophenoxy)phenyl]ethane, 1,1-bis[3,5-dimethyl-4-(4-aminophenoxy)phenyl]ethane, bis[4-(4-aminophenoxy)phenyl]methane, bis[3-methyl-4-(4-aminophenoxy)phenyl]methane, bis[3-chloro-4-(4-aminophenoxy)phenyl]methane, bis[3,5-dimethyl-4-(4-aminophenoxy)phenyl]methane, bis[4-(4-aminophenoxy)phenyl]sulfone, and 2,2-bis[4-(4-aminophenoxy)phenyl]perfluoropropane. Of these, p-phenylenediamine, m-phenylenediamine, 4,4'-diaminodiphenylmethane, 4,4'-diaminodiphenyl ether, 1,4-bis(3-aminophenoxy)benzene, 1,4-bis(4-aminophenoxy)benzene, 2,2-bis[4-(4-aminophenoxy)phenyl]propane, and 2,2-bis[3-methyl-4-(4-aminophenoxy)phenyl]propane are preferred.

Furthermore, from the viewpoint of achieving superior adhesion, the resin of the component (A) preferably contains phenolic hydroxyl groups on the polymer backbone. These hydroxyl groups can be introduced by using a diamine compound having a phenolic hydroxyl group that exhibits high reactivity with epoxy groups. Specific examples of such diamines include the structures shown below.

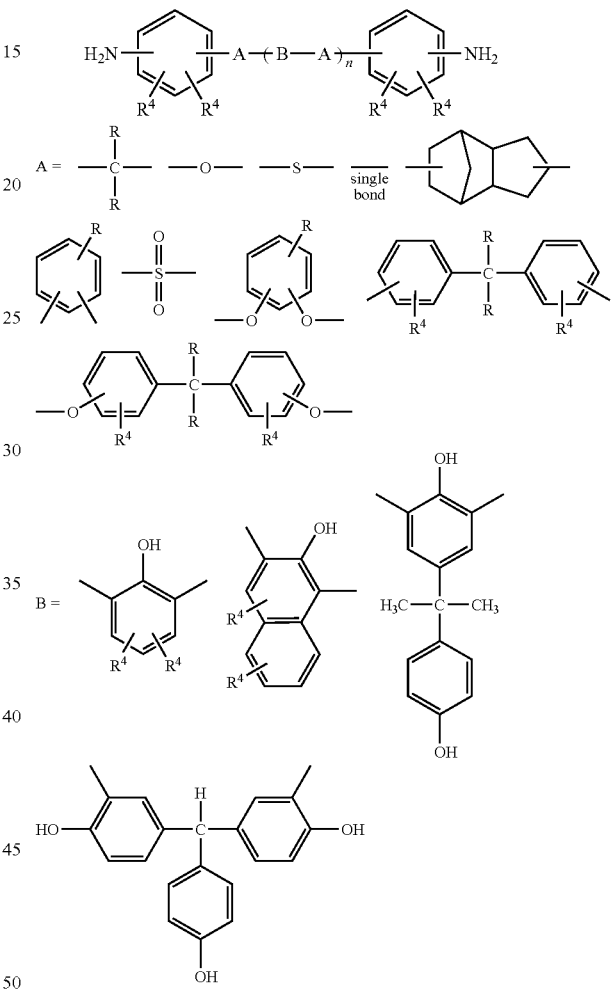

(In these formulas, each $R^4$ represents, independently, a hydrogen atom, a halogen atom such as a fluorine, bromine or iodine atom, or an unsubstituted or substituted monovalent hydrocarbon group of 1 to 8 carbon atoms such as an alkyl group, alkenyl group, alkynyl group, trifluoromethyl group or phenyl group, and the $R^4$ substituent groups bonded to each aromatic ring may be all the same, partially the same, or completely different. n represents an integer from 0 to 5. The A groups are each independently represent any one of the divalent groups stated above, and the B groups are each independently represent any one of the divalent groups stated above. The A and B groups may all represent the same type of group, or may represent two or more different groups. R represents a hydrogen atom, halogen atom, or unsubstituted or substituted monovalent hydrocarbon group.)

Specific examples of suitable unsubstituted or substituted monovalent hydrocarbon group of 1 to 8 carbon atoms for the $R^4$ groups include the same groups as those listed above in relation to $R^2$ and $R^3$, as well as alkynyl groups such as an ethynyl group, propynyl group, butynyl group or hexynyl group. Furthermore, in those cases where R represents an unsubstituted or substituted monovalent hydrocarbon group, specific examples of suitable groups include the same groups as those listed above in relation to $R^4$.

In the present invention, of the various aforementioned diamine compounds having a phenolic hydroxyl group, diamine compounds represented by a formula (2) shown below are particularly desirable.

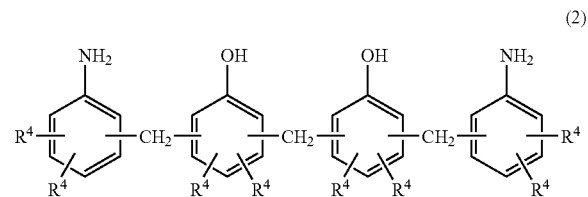

(2)

(wherein, $R^4$ is as defined above)

In the present invention, the blend quantity of the diamine compound having a phenolic hydroxyl group preferably accounts for 5 to 60% by mass, and preferably from 10 to 40% by mass, of the total mass of diamine compounds. If the blend quantity satisfies this range, then a high level of adhesive strength is more readily obtained for the product adhesive, and the flexibility of the adhesive layer can be more readily maintained.

Furthermore, a monoamine having a phenolic hydroxyl group may also be used to introduce phenolic hydroxyl groups into the resin, and examples of suitable compounds include monoamines with the structures shown below.

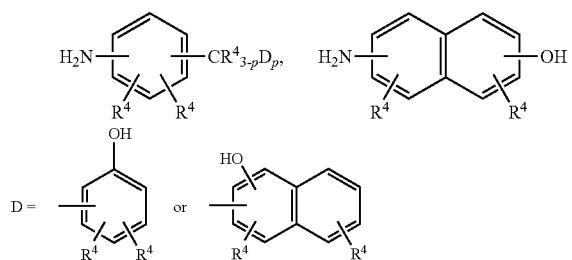

(In the formulas, $R^4$ is as defined above, and the $R^4$ substituent groups bonded to each aromatic ring may be all the same, partially the same, or completely different. In the case where there are plural D groups in a molecule, they may be the same or different. The D groups may all represent the same type of group, or may represent two or more different groups. Furthermore, p represents an integer from 1 to 3.)

If a monoamine having a phenolic hydroxyl group is used, then the blend quantity is typically within a range from 1 to 10 mol % relative to the total quantity of diamine compounds.

The amine compounds are not restricted to those compounds described above. Furthermore, the amine compound may use either a single compound or a combination of two or more different compounds depending on need.

Specific examples of the reactions for producing a polyamic acid resin and a polyimide resin are described below. Namely, the starting raw materials described above are dissolved in a solvent under an inert atmosphere and subsequently reacted together at a temperature that is typically not higher than 80° C., and preferably within a range from 0 to 40° C., thus synthesizing a polyamic acid resin. By subsequently heating the thus obtained polyamic acid resin, typically at a temperature from 100 to 200° C., and preferably from 150 to 200° C., the acid amide portions of the polyamic acid resin undergo a cyclodehydration, yielding a polyimide resin.

Any organic solvent may used in the above reaction, provided it is inert to the product polyamic acid, and even solvents that are not capable of completely dissolving the starting materials may be used. Examples of suitable solvents include tetrahydrofuran, 1,4-dioxane, cyclopentanone, cyclohexanone, γ-butyrolactone, N-methylpyrrolidone, N,N-dimethylacetamide, N,N-dimethylformamide and dimethylsulfoxide. Of these, aprotic polar solvents are preferred, and N-methylpyrrolidone, cyclohexanone and γ-butyrolactone are particularly preferred. These solvents may be used either alone, or in combinations of two or more different solvents.

In order to facilitate the cyclodehydration, the use of an azeotropic dehydrating agent such as toluene or xylene is desirable. Furthermore, the use of a mixed solution of acetic anhydride and pyridine enables the cyclodehydration to be conducted at a lower temperature.

In order to regulate the molecular weight of the polyamic acid resin or the polyimide resin, a dicarboxylic anhydride such as maleic anhydride or phthalic anhydride, and/or aniline, n-butylamine or an aforementioned monoamine having a phenolic hydroxyl group may be added to the reaction mixture. The quantity added of such a dicarboxylic anhydride is typically within a range from 0 to 2 parts by mass per 100 parts by mass of the tetracarboxylic dianhydride, whereas the quantity added of monoamine is typically within a range from 0 to 2 parts by mass per 100 parts by mass of the diamine.

[Component (B)]

The epoxy resin (B) used in the present invention is preferably a compound containing at least two epoxy groups within each molecule. There are no particular restrictions on the molecular structure or molecular weight of the epoxy resin. Examples of suitable epoxy resins include diglycidyl ethers of bis(4-hydroxyphenyl)methane, 2,2'-bis(4-hydroxyphenyl)propane or halides thereof, polycondensation products of such diglycidyl ethers (so-called bisphenol F epoxy resins and bisphenol A epoxy resins), butadiene diepoxide, vinylcyclohexene dioxide, resorcinol diglycidyl ether, 1,4-bis(2,3-epoxypropoxy)benzene, 4,4'-bis(2,3-epoxypropoxy) diphenyl ether, 1,4-bis(2,3-epoxypropoxy)cyclohexene, bis (3,4-epoxy-6-methylcyclohexylmethyl) adipate, epoxy glycidyl ethers or polyglycidyl esters obtained by condensation of 1,2-dioxybenzene, resorcinol, a polyhydric phenol or a polyhydric alcohol with epichlorohydrin, epoxy novolac resins (namely, novolac type epoxy resins) obtained by condensation of a novolac phenolic resin (or halogenated novolac phenolic resin) such as phenol novolac or cresol novolac with epichlorohydrin, epoxidized polyolefins that have been epoxidized using a peroxidation method, epoxidized polybutadiene, naphthalene ring-containing epoxy resins, biphenyl epoxy resins, phenol aralkyl epoxy resins, biphenyl aralkyl epoxy resins, and cyclopentadiene epoxy resins.

A monoepoxy compound may also be used in combination with the aforementioned epoxy compound containing at least two epoxy groups within each molecule, and examples of suitable monoepoxy compounds include styrene oxide, cyclohexene oxide, propylene oxide, methyl glycidyl ether, ethyl glycidyl ether, phenyl glycidyl ether, allyl glycidyl ether, octylene oxide, and dodecene oxide. The epoxy resin used need not necessarily be a single resin, and combinations of two or more epoxy resins may also be used.

The blend quantity of the epoxy resin of the component (B) is preferably within a range from 5 to 200 parts by mass, and even more preferably from 10 to 100 parts by mass, per 100 parts by mass of the polyimide resin of the component (A). If the blend quantity satisfies this range, then the adhesive strength of the product adhesive can be more readily increased, and the flexibility of the adhesive layer can be more readily maintained.

Curing Agent

An epoxy resin curing agent may be used in the adhesive composition of the present invention. This curing agent may use any of the variety of conventionally known epoxy resin curing agents. Examples include amine compounds such as diethylenetriamine, triethylenetetramine, diethylaminopropylamine, N-aminoethylpiperazine, bis(4-amino-3-methyl-cyclohexyl)methane, m-xylylenediamine, menthanediamine, and 3,9-bis(3-aminopropyl)-2,4,8,10-tetraoxaspiro (5,5)undecane; modified aliphatic polyamines such as epoxy resin-diethylenetriamine adducts, amine-ethylene oxide adducts, and cyanoethylated polyamines; phenolic resins containing at least two phenolic hydroxyl groups within each molecule, such as bisphenol A, trimethylolallyloxyphenol, phenol novolac resins with a low degree of polymerization, epoxidized or butylated phenolic resins, and phenolic resins available under the trade names of Super Beckcite 1001 (manufactured by Nippon Reichhold Chemicals Co., Ltd.), Hitanol™ 4010 (manufactured by Hitachi, Ltd.), Scado form L.9 (manufactured by Scado Zwoll of Holland), and Methylon™ 75108 (manufactured by General Electric Co., U.S.A.); carbon resins available under the trade names of Beckamine™ P.138 (manufactured by Nippon Reichhold Chemicals Co., Ltd.), Melan (manufactured by Hitachi, Ltd.), and U-Van 10R (manufactured by Toyo Koatsu Co., Ltd.); amino resins such as melamine resins and aniline resins; polysulfide resins containing at least two mercapto groups within each molecule, as represented by the formula: $HS(C_2H_4OCH_2OC_2H_4SS)_LC_2H_4OCH_2OC_2H_4SH$ (wherein, L represents an integer from 1 to 10); and organic acids or anhydrides thereof such as phthalic anhydride, hexahydrophthalic anhydride, tetrahydrophthalic anhydride, pyromellitic anhydride, methylnadic acid, dodecylsuccinic anhydride, and chlorendic anhydride. Of the above curing agents, phenolic resins (phenolic novolac resins) are particularly desirable as they impart favorable moldability and superior moisture resistance to the composition of the present invention, and are also non-toxic and comparatively inexpensive. The curing agent need not necessarily be limited to a single material, and combinations of two or more curing agents may also be used in accordance with their curing performance.

The blend quantity of the curing agent varies depending on the specific nature of the curing agent, although a typical quantity is within a range from 1 to 100 parts by mass, and preferably from 5 to 50 parts by mass, per 100 parts by mass of the epoxy resin. If the blend quantity satisfies this range, then the concentration of the epoxy resin can be maintained within an appropriate range, which means the resulting composition can be cured readily without requiring an overly long period of time, the physical properties of the cured product can be more readily maintained, and the composition is economically viable.

In those cases where a polyimide resin having phenolic hydroxyl groups within the resin backbone is used as the component (A), the blend ratio between the epoxy resin and the phenolic resin curing agent is important. In such a case, the curing reaction proceeds by utilizing the reaction between the phenolic hydroxyl groups and the epoxy groups. The combined blend quantity of the epoxy resin and the phenolic resin curing agent is typically within a range from 1 to 900 parts by mass, and preferably from 5 to 400 parts by mass, per 100 parts by mass of the polyimide resin. If this combined blend quantity satisfies this range, then the resulting adhesive is more likely to exhibit favorable adhesive strength to adherends, and the elastic modulus is less likely to increase, meaning a flexible adhesive sheet can be more readily obtained.

There are no particular restrictions on the chemical equivalence ratio between the epoxy resin and the combined total of the phenolic resin curing agent and the polyimide resin having phenolic hydroxyl groups within the resin backbone, but ratios within a range from 0.7 to 1.3 are preferred, and ratios from 0.8 to 1.2 are particularly desirable. If this chemical equivalence ratio satisfies this range, then changes over time in the properties of the composition can be more readily prevented.

Even in those cases where the epoxy resin curing agent is not a phenolic resin, the blend quantities of the polyimide resin and the epoxy resin, and the chemical equivalence ratio preferably still satisfy the above ranges.

[Component (C)]

There are no particular restrictions on the epoxy resin curing catalyst (C) used in the present invention, and suitable examples include phosphorus-based catalysts and amine-based catalysts.

Examples of suitable phosphorus-based catalysts include triphenylphosphine, triphenylphosphonium triphenylborate, tetraphenylphosphonium tetraphenylborate, and compounds of the formula shown below.

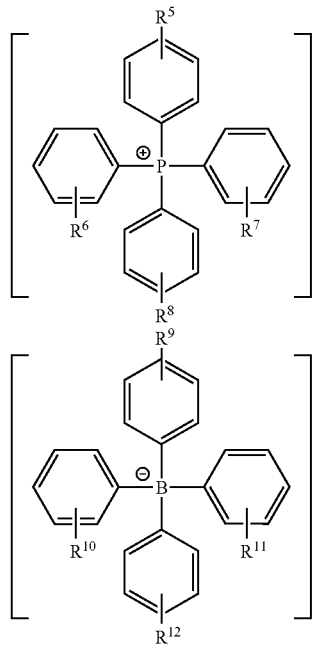

(wherein, $R^5$ to $R^{12}$ each represent a hydrogen atom; a halogen atom such as a fluorine, bromine or iodine atom; an unsubstituted or substituted monovalent hydrocarbon group of 1 to 8 carbon atoms such as an alkyl group, alkenyl group, alkynyl group, trifluoromethyl group, or phenyl group; or an alkoxy group of 1 to 8 carbon atoms. These substituent groups may be all the same, partially the same, or all completely different.)

In those cases where $R^5$ to $R^{12}$ represent monovalent hydrocarbon groups, examples of suitable groups include the same hydrocarbon groups as those listed above in relation to $R^4$. Furthermore, in those cases where $R^5$ to $R^{12}$ represent alkoxy groups of 1 to 8 carbon atoms, examples of suitable groups include a methoxy group, ethoxy group, propoxy group, isopropoxy group, or butoxy group.

Examples of suitable amine-based catalysts include dicyandiamide, and imidazole derivatives such as 2-methylimidazole, 2-ethyl-4-methylimidazole, 1-cyanoethyl-2-methylimidazole, and 2-phenyl-4,5-dihydroxymethylimidazole.

The epoxy resin curing catalyst of the present invention may use either a single compound or a mixture of two or more compounds selected from the catalysts described above. The blend quantity of the epoxy resin curing catalyst (C) is determined as an effective catalytic quantity.

[Component (D)]

Examples of the inorganic filler (D) used in the present invention include fillers such as finely powdered silica, alumina, titanium oxide, carbon black, and conductive particles such as silver particles; colorants such as inorganic or organic pigments and dyes; and other additives such as wetting agents, antioxidants, and thermal stabilizers, which can be added to the composition according to need. The blend quantity of these fillers preferably accounts for 5 to 90% by mass, and even more preferably from 10 to 70% by mass, of the adhesive composition. If the blend quantity satisfies this range, then the properties targeted by the addition of these inorganic fillers, such as improved conductivity and thermal conductivity, reduced water absorption, and a reduced coefficient of linear expansion can be more readily achieved, and significant increases in viscosity can be prevented, meaning the bonding performance of the film can be retained, and a uniform film with favorable surface qualities can be more readily obtained. The average particle size of the inorganic filler is preferably within a range from 0.1 to 10 μm, and even more preferably from 0.5 to 7 μm. If the average particle size of the inorganic filler satisfies this range, then the melt viscosity of the film is less likely to increase, meaning the bonding performance of the film can be retained, and a uniform film with favorable surface qualities can be more readily obtained. Furthermore, recent demands require an adhesive layer thickness of 15 to 50 μm, and provided the average particle size of the inorganic filler satisfies the above range, even secondary aggregate particles of the filler are unlikely to exceed the above film thickness range, meaning quality demands can be readily met.

[Adhesive Composition]

An adhesive composition of the present invention has a melt viscosity at 40 to 80° C. of not more than 10,000 Pa·s (namely, a melt viscosity that is not more than 10,000 Pa·s across the entire temperature range from 40 to 80° C.), and this melt viscosity is preferably not more than 8,000 Pa·s. In those cases where the composition of the present invention is used as a bonding sheet for producing a semiconductor device, the above viscosity is ideal for conducting thermocompression bonding of a wafer to a substrate through the bonding sheet. Thermocompression bonding is preferably conducted at a temperature of 40 to 80° C., and if the aforementioned melt viscosity is greater than 10,000 Pa·s, then when an attempt is made to bond the adhesive composition to the back surface of a semiconductor wafer, either bonding fails as a result of insufficient adhesive strength, or even if bonding succeeds, problems may arise in subsequent steps, including wafer fragments flying off during the wafer cutting step, and the adhesive layer losing adhesion to the wafer during the wafer removal step that is conducted following the cutting step, so that the wafer is removed by itself without the adhesive layer. Although the bonding temperature may be raised above 80° C. to reduce the melt viscosity, if bonding between the wafer and the adhesive is conducted at a high temperature, then the difference in the coefficients of linear expansion of the adhesive and the wafer mean that when the bonded structure is cooled to room temperature, problems such as warping may develop between the bonded adhesive and the wafer, and in the worst case, this warping may cause the wafer to break.

Moreover, a feature of a composition of the present invention is that after the composition is heated for a period of 1 minute to 2 hours at a temperature within a range from 80° C. to $(T+50)°$ C. (wherein, T represents the curing start temperature for the composition), this also applies to all subsequent references to T), the melt viscosity of the composition at a temperature of 100° C. to $(T+30)°$ C. is within a range from 100 to 10,000 Pa·s.

The above curing start temperature is determined on the basis of the shape of a differential scanning calorimetry (DSC) curve obtained in the case where the DSC chart is prepared by placing 10 mg of the composition in an aluminum cell, using an empty aluminum cell as a reference sample, and heating the composition in air from room temperature to 300° C. at a rate of temperature increase of 10° C./minute. DSC curves measured under the measurement conditions above for the compositions according to the present invention, particularly the preferred composition comprising the components (A) to (D), contain two straight portions. The first straight portion appears at least within a range from 90° C. to 140° C. Thereafter, the DSC curves start to rise with an increase of temperature and then continue to go up to the peak. The second straight portion appears in the course from the rising start to the peak. The curing start temperature is determined as the intersection point of the two straight lines defined by the two straight portions, respectively.

When the adhesive layer of a bonding sheet is bonded to a substrate, the adhesive layer usually develops a heat history. The heating time is particularly long in the wire bonding step. During this step, curing of the adhesive layer proceeds to a certain extent. With a composition of the present invention, even if curing proceeds, the composition still exhibits a melt viscosity that ensures no voids are left within indentations in the substrate. Provided the melt viscosity following heating satisfies the above range, then when molding pressure is applied during the subsequent resin-sealing step, the adhesive is still able to fill any substrate indentations. If the melt viscosity is greater than the upper limit of the above range, then the adhesive is unable to fill the fine surface irregularities on the surface of substrates such as circuit boards, which can cause a deterioration in the reliability. In contrast, if the melt viscosity is lower than the lower limit of the above range, then when molding is conducted using an epoxy molding compound, the very low viscosity of the resin means sufficient pressure cannot be applied to the resin, which can also result in unsatisfactory filling of fine voids and a deterioration in the reliability. The melt viscosity at a temperature of 100° C. to $(T+30)°$ C. is preferably within a range from 300 to 3,000 Pa·s.

The heating for a period of 1 minute to 2 hours at a temperature within a range from 80° C. to $(T+50)°$ C. preferably involves heating for a period of to 2 to 90 minutes at a temperature within a range from 150° C. to (T+50)° C., and even more preferably involves heating for a period of to 3 to 60 minutes at a temperature within a range from 150° C. to (T+50)° C., and this heating can be conducted during the wire bonding step. In those cases when a composition of the present invention is used in a process that does not include a wire bonding step, a separate heating step is preferably conducted at a temperature within the above range.

The above adhesive composition can be prepared by mixing together desired ingredients, e.g., in the case of the preferred composition stated above, the polyimide resin (A), the epoxy resin (B), the epoxy resin curing catalyst (C), the inorganic filler (D), and any other components using conventional methods.

[Methods of Use and Adhesive Films]

For example, by dissolving a suitable concentration of the adhesive composition obtained above in an aprotic polar solvent such as toluene, cyclohexanone or NMP, applying the thus obtained solution to a substrate, drying the solution, subsequently thermocompression bonding an adherend to the adhesive composition, and then heat-curing the adhesive composition, the substrate and the adherend can be bonded together. Furthermore, by applying a solution containing a suitable concentration of the adhesive composition dissolved in a solvent to a support substrate, and then drying the solution to form an adhesive layer, a laminate comprising the support substrate and the adhesive layer (which is, hereafter, referred to as an adhesive film) can be obtained. In the operation of die bonding, after peeling off the adhesive film from the support substrate by sandwiching this adhesive film between a substrate and an adherend and then conducting compression bonding and heat-curing, the substrate and the adherend can be bonded together. Examples of suitable support substrates for forming the adhesive film include polyethylene, polypropylene, polyester, polyamide, polyimide, polyamideimide, polyetherimide, polytetrafluoroethylene, paper, metal foil, or support substrates such as those described above that have been surface-treated with a release agent. The substrate includes, for example, packages and lead frames.

The drying process conducted during formation of the above adhesive layer is typically conducted at a temperature within a range from room temperature to 200° C., and preferably from 80 to 150° C., for a time period within a range from 1 minute to 1 hour, and preferably from 3 to 10 minutes.

There are no particular restrictions on the thickness of the adhesive layer, which can be selected in accordance with the intended purpose, although the thickness is preferably within a range from 10 to 100 μm, and even more preferably from 15 to 50 μm. Furthermore, during curing of the adhesive layer, compression bonding is preferably first conducted at a pressure within a range from 0.01 to 10 MPa, and even more preferably from 0.1 to 2 MPa, and heat-curing is then preferably conducted at a temperature within a range from 100 to 200° C., and even more preferably from 120 to 180° C., for a time period within a range from 30 minutes to 5 hours, and preferably from 1 to 2 hours.

An adhesive of the present invention can be used not only in the production of electronic components, but also in all manner of other processes that require adhesion.

EXAMPLES

As follows is a more detailed description of the present invention based on a series of examples and reference examples, although the present invention is in no way limited by the examples presented below.

Synthesis Example 1

Synthesis of Polyimide Resin

A 1 liter separable flask equipped with a 25 ml quantitative moisture receiver that is fitted with a stopcock and also connected to a reflux condenser, a thermometer, and a stirrer was charged with 44.03 parts by mass of a diaminosiloxane KF-8010 (manufactured by Shin-Etsu Chemical Co., Ltd.) represented by the structural formula shown below, and 100 parts by mass of 2-methylpyrrolidone as the reaction solvent. The mixture was stirred at 80° C., thereby dispersing the diamine. A solution containing 38.72 parts by mass of 6FDA (2,2-bis(3,4-dicarboxyphenyl)hexafluoropropane dianhydride) as the acid anhydride, and 100 parts by mass of 2-methylpyrrolidone was then added dropwise to the dispersion, and the reaction was continued under constant stirring for 2 hours at room temperature, thereby synthesizing an acid anhydride-rich amic acid oligomer.

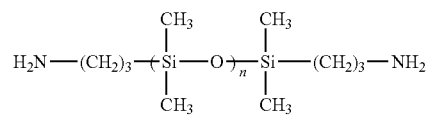

(wherein, n=10 (average value))

Subsequently, a 1 liter separable flask equipped with a 25 ml quantitative moisture receiver that is fitted with a stopcock and also connected to a reflux condenser, a thermometer, and a stirrer was charged with 17.25 parts by mass of a phenolic hydroxyl group-containing aromatic diamine (diamine-1) represented by a formula shown below, and 100 parts by mass of 2-methylpyrrolidone,

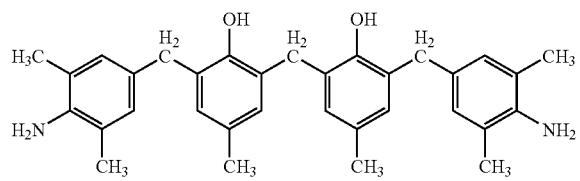

and following dispersion of the diamine, the acid anhydride-rich amic acid oligomer obtained above was added dropwise to the dispersion, and the resulting mixture was stirred for 16 hours at room temperature, thereby synthesizing a polyamic acid solution. Subsequently, 25 ml of xylene was added, the temperature was raised, and the solution was heated under reflux for 2 hours at approximately 180° C. Once a predetermined quantity of water had collected within the quantitative moisture receiver and the production of water had ceased, the water collected in the quantitative moisture receiver was removed and the xylene was removed at a temperature of 180° C. Following completion of the reaction, the reaction solution was added dropwise to a large excess of methanol to precipitate the polymer. The polymer was collected and then dried under reduced pressure, yielding a polyimide resin having phenolic hydroxyl groups within the resin backbone.

Analysis of the thus obtained polyimide resin by infrared absorption spectroscopy revealed no polyamic acid absorption that would indicate the presence of unreacted functional groups. Absorption peaks derived from imide groups were observed at 1780 cm$^{-1}$ and 1720 cm$^{-1}$, and an absorption peak derived from the phenolic hydroxyl groups was observed at 3500 cm$^{-1}$.

Examples 1 to 5, Reference Examples 1 to 2

50 parts by mass of the polyimide resin obtained in the synthesis example 1 was dissolved in 50 parts by mass of cyclohexanone, thus forming a solution. This solution was combined with an epoxy resin RE310S (manufactured by Nippon Kayaku Co., Ltd.), dicyandiamide (DICY) (manufactured by Shikoku Chemicals Corporation) as a curing catalyst, and a 70% by mass cyclohexanone solution of silica (product name: SE2050, manufactured by Admatechs Co., Ltd.) as an inorganic filler, using the blend quantities (parts by mass) shown below in Table 1, thus yielding an adhesive composition. The properties of each of the prepared adhesive compositions were measured using the methods described below. The results of these measurements are shown in Table 1.

(1) Adhesive Composition Properties

15 μm Gap Filling Performance

Each of the resin compositions from the examples 1 to 5 and the reference examples 1 and 2 was used to form an adhesive layer (thickness: 25 μm) on one surface of a transparent glass plate of dimensions 5 mm×5 mm×500 μm. The resulting transparent glass plate and attached adhesive layer was die bonded to a PCB (printed circuit board) having an uneven pattern with an average unevenness of 15 μm, with the adhesive layer contacting the uneven layer of the PCB, under conditions including a temperature of 160° C., a pressure of 0.3 MPa, and a bonding period of 2 seconds. Subsequently, the bonded structure was subjected to thermocompression at 175° C. and 6 MPa for 30 minutes. The resulting pseudo-device (an integrated molding of the glass plate and the PCB) was inspected for the presence of voids by viewing the structure under a microscope through the transparent glass surface. This observation was used to confirm whether or not the 15 μm gaps had been filled.

Curing Start Temperature

The curing start temperature was measured using a differential scanning calorimetry (DSC) chart obtained by placing 10 mg of the composition in an aluminum cell, using an empty aluminum cell as a reference sample, and then using a differential scanning calorimeter (Thermoplus DSC8230, manufactured by Rigaku Corporation) to heat the composition in air from room temperature to 300° C. at a rate of temperature increase of 10° C./minute.

For example, the curing start temperature of the adhesive composition of the example 1 was determined as stated below. FIG. 1 is a DSC chart for the adhesive composition of the example 1. As shown in FIG. 1, the DSC curve 1 contains a straight portion $L_1$ observed at least within the temperature range of 90 to 140° C. The DSC curve 1 contains another straight portion $L_2$ in the course of the curve after starting to rise above but before reaching the peak P. The intersection point 4 of the straight line 2 defined by the extension of the straight portion $L_1$ and the straight line 3 defined by the extension of the straight portion $L_2$ was sought. Thus, the temperature 180° C. indicated by the intersection point 4 was taken as the curing start temperature of the composition.

(2) Properties of Adhesive Film prior to Curing

Each of the adhesive compositions obtained above was applied to the surface of a PET film of thickness 50 μm (hereafter referred to as the substrate film) that had been coated with a fluorosilicone release agent, another coated substrate film was placed on top of the adhesive composition with the fluorosilicone release agent coating facing the composition, and the resulting structure was heated and dried at 120° C. for a period of 10 minutes, thereby forming an adhesive layer with a thickness of approximately 50 μm and completing preparation of a substrate film-bearing adhesive film.

Melt Viscosity Prior to Heating

The substrate films were removed from the substrate film-bearing adhesive film obtained above to form an adhesive film with a thickness of 50 μm, and 20 of these adhesive films were then laminated together, yielding a laminate of thickness 1 mm. The melt viscosity of this laminate at 80° C. was measured using a MRAS measuring apparatus supplied by HAAKE Corp.

Melt Viscosity Following Heating

Samples of the same laminates were heated at a heating temperature shown in Table 1 for a time period also shown in Table 1, thus yielding heat-treated laminates. The melt viscosity at 175° C. of each of these heat-treated laminates was measured in the same manner as that described above.

(3) Properties of Cured Adhesive Film

The properties of the cured adhesive films obtained by curing each of the adhesive films (namely, the dynamic storage elastic modulus, the glass transition point, the shear bond strength between the adhesive film and the substrate, and the shear bond strength following storage under high temperature and high humidity) were evaluated using the methods described below.

Dynamic Storage Elastic Modulus

A substrate film-bearing adhesive film obtained above was heat-treated for 1 hour at 175° C. to cure the adhesive film. The dynamic storage elastic modulus of the cured adhesive film of dimensions 20 mm×5 mm×50 μm obtained by peeling off the substrate films was then measured. The dynamic storage elastic modulus was measured using a dynamic viscoelasticity tester in tensile mode, under conditions including a distance between chucks of 15 mm, a measurement temperature of 25° C., and a measurement frequency of 30 Hz.

Glass Transition Point

A substrate film-bearing adhesive film obtained above was heat-treated for 1 hour at 175° C. to cure the adhesive film. The glass transition point of the cured adhesive film of dimensions 20 mm×5 mm×50 μm obtained by peeling off the substrate films was then measured. The glass transition point was measured using a thermomechanical analyzer TMA-2000 (a brand name, manufactured by Ulvac, Inc.) in tensile mode, under conditions including a distance between chucks of 15 mm, a measurement temperature of 25 to 300° C., a rate of temperature increase of 10° C./minute, and a measurement load of 10 g.

Shear Bond Strength

A substrate film-bearing adhesive film obtained above was cut into a sample with dimensions of 5 mm×5 mm, and the substrate film was peeled off one surface to expose the adhesive layer. This adhesive film was thermocompression bonded to a sheet of 42-alloy with dimensions of 18 mm×18 mm (product name: KAKU-42, a 42-alloy test piece manufactured by Toppan Printing Co., Ltd.), with the exposed adhesive layer contacting the 42-alloy, under conditions including a temperature of 80° C., a pressure of 0.01 MPa, and a bonding time of 30 seconds, thereby securing the adhesive film to the 42-alloy. Subsequently, the remaining substrate film was peeled off, and another sheet of 42-alloy with dimensions of 18 mm×18 mm was thermocompression bonded to the exposed adhesive layer using the same conditions as above. The thus obtained laminate was then heated for 1 hour at 175° C. to cure the adhesive layer, yielding a test piece for measuring the bond strength. The shear bond strength of this test piece at a pull rate of 2.0 mm/minute was measured using an Autograph tensile tester manufactured by Shimadzu Corporation.

Shear Bond Strength after Storage at High Temperature and High Humidity

A test piece for measuring bond strength prepared in the manner described above was allowed to stand for 168 hours in an atmosphere at 85° C. and 85% RH, and the shear bond strength of the test piece at a pull rate of 2.0 mm/minute was then measured using an Autograph tensile tester manufactured by Shimadzu Corporation.

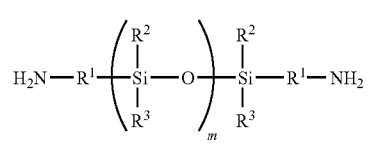

(1)

wherein, $R^1$ groups represent identical or different bivalent organic groups of 3 to 9 carbon atoms, $R^2$ and $R^3$ are identical or different and each represents a methyl group or a phenyl group, and m represents an integer from 1 to 200, and wherein the quality of the inorganic filler of component (D) accounts for 33 to 70% by mass of the adhesive composition.

2. The adhesive composition according to claim 1, wherein said diamine compound further comprises a diamine represented by a formula (1A) shown below:

TABLE 1

| | | Example | | | | | Reference Example | |
|---|---|---|---|---|---|---|---|---|
| | | 1 | 2 | 3 | 4 | 5 | 1 | 2 |
| Polyimide resin (solid fraction) | | 45 | 45 | 45 | 20 | 20 | 45 | 45 |
| Epoxy resin | RE310S | 42.8 | 42.8 | 42.8 | 38 | 38 | 42.8 | 42.8 |
| DICY curing catalyst | | 2.3 | 2.3 | 2.3 | 2 | 2 | 2.3 | 2.3 |
| Silica filler | SE2050 | 90 | 60 | 45 | 90 | 60 | 90 | 90 |
| (1) Properties of Adhesive composition | | | | | | | | |
| Gap filling performance | 15 μm gap | good | good | good | good | good | voids present | |
| Curing start temperature | ° C. | 180 | 180 | 180 | 190 | 190 | 180 | 180 |
| (2) Properties of Adhesive film prior to curing | | | | | | | | |
| Melt viscosity prior to heating (80° C.) | (Pa · s) | 200 | 100 | 60 | 100 | 100 | 200 | 200 |
| Heating conditions | Heating temperature (° C.) | 170 | 170 | 170 | 170 | 170 | 25 | 170 |
| | Heating time (min.) | 3 | 3 | 3 | 6 | 9 | 0 | 180 |
| Melt viscosity after heating (175° C.) | (Pa · s) | 1200 | 900 | 600 | 800 | 1300 | 50 | 100,000 |
| (3) Properties of Adhesive film after curing | | | | | | | | |
| Dynamic storage elastic modulus | (MPa) | 2500 | 1300 | 1000 | 300 | 300 | 2500 | 2500 |
| Glass transition point | ° C. | 125 | 125 | 125 | 135 | 135 | 125 | 125 |
| Shear bond strength | Initial | 19 | 21 | 16 | 18 | 18 | 19 | 19 |
| | after 85° C./85% RH | 19 | 20 | 15 | 19 | 18 | 19 | 19 |

What is claimed is:

1. An adhesive composition, which exhibits a melt viscosity at 40 to 80° C. of not more than 10,000 Pa·s, and which after heating for a period of 1 minute to 2 hours at a temperature within a range from 80° C. to (T+50)° C., exhibits a melt viscosity at a temperature of 100° C. to (T+30)° C. that is within a range from 300 to 10,000 Pa·s, wherein T represents a curing start temperature for said composition, said composition comprising:

(A) at least one resin selected from the group consisting of polyamic acid resins having a diorganopolysiloxane chain and phenolic hydroxyl groups within a polymer backbone, and polyimide resins that are ring-closing derivatives of said polyamic acid resins, (B) an epoxy resin, (C) an epoxy resin curing catalyst, and (D) an inorganic filler comprising finely powdered silica, wherein said polyimide resin of said component (A) comprises a polyimide resin obtained by reacting a tetracarboxylic dianhydride with a diamine compound that comprises a diamine represented by a formula (1):

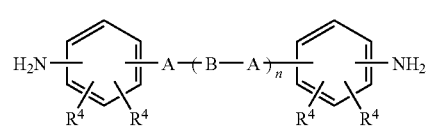

(1A)

wherein, each $R^4$ represents, independently, a hydrogen atom, halogen atom, or unsubstituted or substituted monovalent hydrocarbon group of 1 to 8 carbon atoms, n represents an integer from 0 to 5, each A represents, independently,

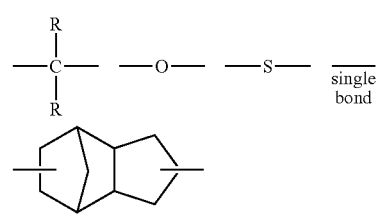

-continued

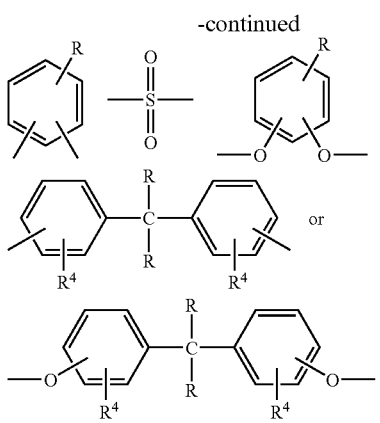

wherein R⁴ is as defined above, each R represents, independently, a hydrogen atom, halogen atom, or unsubstituted or substituted monovalent hydrocarbon group, and each B represents, independently,

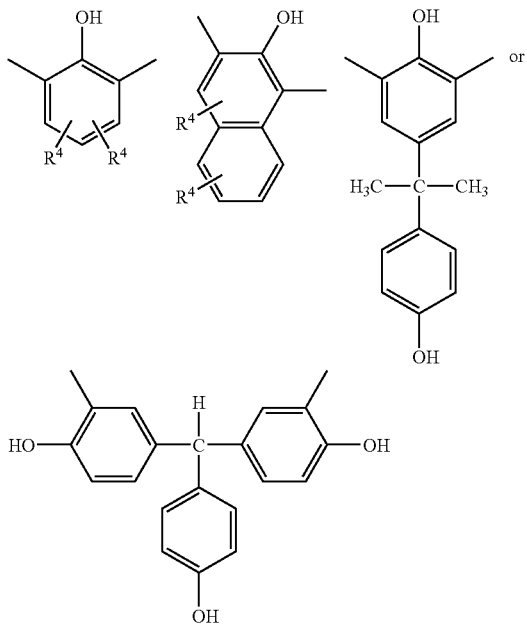

wherein, R⁴ is as defined above.

3. The adhesive composition according to claim 2, wherein said diamine is a diamine represented by a formula (2) shown below:

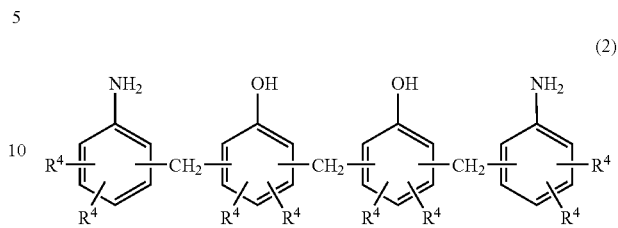

(2)

wherein, R⁴ is as defined above.

4. The adhesive composition according to claim 1, wherein the average particle size of the inorganic filler of component (D) is within a range from 0.1 to 10 μm.

5. The adhesive composition according to claim 1, wherein the average particle size of the inorganic filler of component (D) is within a range from 0.5 to 7 μm.

6. The adhesive composition according to claim 1, wherein the inorganic filler of component (D) consists of finely powdered silica.

7. The adhesive composition according to claim 1, wherein the quantity of said diamine represented by the formula (1) accounts for 1 to 80 mol % of said diamine compound.

8. The adhesive composition according to claim 1, wherein the quantity of said diamine represented by the formula (1) accounts for 1 to 60 mol % of said diamine compound.

9. The adhesive composition according to claim 2, wherein the quantity of said diamine represented by the formula (1A) accounts for 5 to 60% by mass of said diamine compound.

10. The adhesive composition according to claim 2, wherein the quantity of said diamine represented by the formula (1A) accounts for 10 to 40% by mass of said diamine compound.

11. The adhesive composition according to claim 1, which after said heating exhibits a melt viscosity at a temperature of 100° C. to (T+30)° C. that is within a range from 300 to 3,000 Pa·s, wherein T is as defined above.

\* \* \* \* \*